United States Patent
Lee et al.

(10) Patent No.: US 8,747,502 B2
(45) Date of Patent: Jun. 10, 2014

(54) PARTICULATE MATTER REDUCTION APPARATUS FOR DIESEL ENGINE

(75) Inventors: Heon-Ju Lee, Jeju-si (KR); Vadim Yurevich Plaksin, Jeju-si (KR)

(73) Assignee: Industry-Academic Cooperation Foundation, Jeju National University, Jeju-si (KR)

( * ) Notice: Subject to any disclaimer, the term of this patent is extended or adjusted under 35 U.S.C. 154(b) by 533 days.

(21) Appl. No.: 12/919,425

(22) PCT Filed: Feb. 23, 2009

(86) PCT No.: PCT/KR2009/000844
§ 371 (c)(1),
(2), (4) Date: Aug. 25, 2010

(87) PCT Pub. No.: WO2009/107951
PCT Pub. Date: Sep. 3, 2009

(65) Prior Publication Data
US 2011/0005205 A1    Jan. 13, 2011

(30) Foreign Application Priority Data

Feb. 25, 2008  (KR) .................. 10-2008-0016581
Aug. 26, 2008  (KR) .................. 10-2008-0083450
Aug. 26, 2008  (KR) .................. 10-2008-0083475

(51) Int. Cl.
| | |
|---|---|
| *F01N 3/027* | (2006.01) |
| *F01N 3/021* | (2006.01) |
| *F01N 3/28* | (2006.01) |
| *B01D 39/00* | (2006.01) |
| *B01D 41/00* | (2006.01) |
| *B01D 45/00* | (2006.01) |
| *B01D 46/00* | (2006.01) |
| *B01D 49/00* | (2006.01) |
| *B01D 50/00* | (2006.01) |
| *B01D 51/00* | (2006.01) |

(52) U.S. Cl.
USPC ....... 55/282.2; 55/282.3; 55/385.3; 55/428.1; 55/523; 55/DIG. 10; 55/DIG. 30; 95/283

(58) Field of Classification Search
USPC ............... 55/282.2, 282.3, 385.3, 428.1, 523, 55/DIG. 10, DIG. 30; 95/283; 60/295, 297, 60/311
See application file for complete search history.

(56) References Cited

U.S. PATENT DOCUMENTS 5,290,334 A * 3/1994 Alexander ...................... 65/335
5,413,767 A * 5/1995 Breuer et al. ................ 422/174

(Continued)

FOREIGN PATENT DOCUMENTS

| JP | 05-6120 | 1/1993 |
| JP | 07-042532 | 2/1995 |

(Continued)

Primary Examiner — Thomas Denion
Assistant Examiner — Dapinder Singh
(74) Attorney, Agent, or Firm — NSIP Law (57) ABSTRACT

A particulate matter reduction apparatus for a diesel engine, which can reduce particulate matter in a convenient manner with a relatively simple structure, while preventing the shortening of the lifespan of a filter and improving particulate matter burning efficiency, is provided. The particulate matter reduction apparatus includes a housing configured to be placed on a flow path into which exhaust gas is discharged from the diesel engine, a filter configured to collect particulate matter contained in the exhaust gas that flows in the housing, electrodes configured to transmit electronic signals to the filter, and a control unit configured to control the electric signals provided to the electrodes. The particulate matter reduction apparatus is advantageous in that particulate matter is burnt and removed by directly heating the filter. In addition, the apparatus is more convenient, compared to a system which requires a filter to be separated and cleaned. In addition, the particulate matter reduction apparatus has a more simplified structure, compared to a system that heats a filter using an electric heater or a diesel burner. Accordingly, the manufacturing cost can be reduced. Furthermore, the particulate matter reduction apparatus is advantageous in that the filter is relatively uniformly heated rather than being partially heated, so that a long lifespan of the filter can be assured.

4 Claims, 11 Drawing Sheets

(56) References Cited

U.S. PATENT DOCUMENTS

| | | | |
|---|---|---|---|
| 5,578,102 A * | 11/1996 | Alexander | 65/27 |
| 5,651,248 A * | 7/1997 | Kawamura | 60/286 |
| 6,660,061 B2 * | 12/2003 | Josephson et al. | 95/2 |
| 6,708,486 B2 * | 3/2004 | Hirota et al. | 60/297 |
| 7,055,314 B2 * | 6/2006 | Treiber | 60/297 |
| 7,326,264 B2 * | 2/2008 | Hammer | 55/282.3 |
| 7,497,889 B2 * | 3/2009 | Furukawa et al. | 55/523 |
| 7,674,513 B2 * | 3/2010 | Ahmed et al. | 428/116 |
| 7,963,106 B2 * | 6/2011 | Schmidt et al. | 60/295 |
| 8,043,658 B2 * | 10/2011 | Phelps et al. | 427/244 |
| 8,080,081 B2 * | 12/2011 | Bruck | 55/523 |
| 2008/0072756 A1 * | 3/2008 | Lee | 96/19 |
| 2009/0071126 A1 * | 3/2009 | Gonze et al. | 60/286 |
| 2009/0071127 A1 * | 3/2009 | Gonze et al. | 60/286 |
| 2009/0071338 A1 * | 3/2009 | Gonze et al. | 95/283 |
| 2009/0090089 A1 * | 4/2009 | Phelps et al. | 55/282.3 |
| 2009/0113883 A1 * | 5/2009 | Bhatia et al. | 60/320 |

FOREIGN PATENT DOCUMENTS

| | | |
|---|---|---|
| JP | 08-100630 | 6/1996 |
| JP | 2004-076669 | 3/2004 |
| JP | 2006-183602 | 7/2006 |
| KR | 1993-703074 | 11/1993 |
| KR | 10-2006-0047096 | 5/2006 |

\* cited by examiner

PARTICULATE MATTER REDUCTION APPARATUS FOR DIESEL ENGINE

CROSS-REFERENCE TO RELATED APPLICATION

This application claims the benefit under 35 U.S.C. §119(a) of International Patent Application No. PCT/KR2009/000844, filed on Feb. 23, 2009, the entire disclosure of which is incorporated herein by reference for all purposes.

BACKGROUND

1. Field

The following description relates to a particulate matter reduction apparatus for a diesel engine, which reduces particulate matters in exhaust gas discharged from a diesel engine.

2. Description of the Related Art

A diesel engine employed in an automobile, a diesel vessel and a diesel locomotive has is advantages of superior fuel economy and powerful output, however it is by its nature bound to discharge a significant amount of particulate matters included in the exhaust gas, unlike a gasoline engine.

Since particulate matters are regarded as a main factor of air pollution, regulations limiting the particulate matters have been tightened. Accordingly, a diesel engine is equipped with a diesel particulate filter (DPF) to reduce the discharge amount of particulate matter. The DPF acts to collect particulate matter exhausted from the diesel engine to reduce it.

In use of the DPF, a method of removing the collected particulate matter has arisen as a key issue. For example, a method of separating a filter and washing it has been introduced. However, although this method does not require a diesel vehicle to be equipped with another device, it does cause users the inconvenience of having to exchange filters periodically.

As another example, a method of burning particulate matter collected in a filter has been suggested. According to the method, an electric heater or a diesel burner is installed in a portion of the filter in which exhaust gas flows, and the exhaust gas is heated to a temperature that is capable of igniting particulate matter inside the exhaust gas.

However, since the above method requires an electric heater or a diesel burner to be additionally installed, it complicates the structure of the filter and increases manufacturing cost. Moreover, a portion of the filter close to the electric heater or the diesel burner can be overheated, and consequently it may shorten the lifespan of the filter.

As another example, a method of adding an additive to fuels to promote combustion of particulate matter collected on a filter at a low temperature, and a method of applying a catalyst to the filter have been introduced. However, the use of an additive is disadvantageous in that a specific type of a fuel must be used, for example, mass fraction of sulfur contained in the fuel is should be smaller than a certain value. Furthermore, the method of applying a catalyst to a filter is not as efficient as the method of adding the additive in fuels in terms of lowering a temperature that is capable of igniting particulate matter, and thus an additional heat source or additive is required.

SUMMARY

The following description relates to a particulate matter reduction apparatus for a diesel engine which can easily reduce particulate matter with a simple structure while preventing reduction of lifespan of a filter and increasing combustion efficiency with respect to particulate matter.

In one general aspect, provided is a particulate matter reduction apparatus for a diesel engine, the particulate matter reduction apparatus including: a housing configured to be placed on a flow path into which exhaust gas is discharged from the diesel engine; a filter configured to collect particulate matter contained in the exhaust gas that flows in the housing; electrodes configured to transmit electronic signals to the filter; and a control unit configured to control the electronic signals provided to the electrodes.

As described above, a filter is directly heated to burn and remove particulate matters by use of a vehicle power supply without an extra power supply, and thus it may be more convenient, compared to a system that removes and cleans a filter. In addition, the particulate matter reduction apparatus has a more simplified structure, compared to a system that heats a filter using an electric heater or a diesel burner. Accordingly, manufacturing cost can be reduced. Moreover, the filter is relatively uniformly heated without no overheated portion, and thus a long lifespan of the filter may be assured.

Furthermore, the particulate matter reduction apparatus does not require an additive in a is fuel for lowering an ignition temperature of the particulate matters, and hence a vehicle may not need to use only a particular type of fuel.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
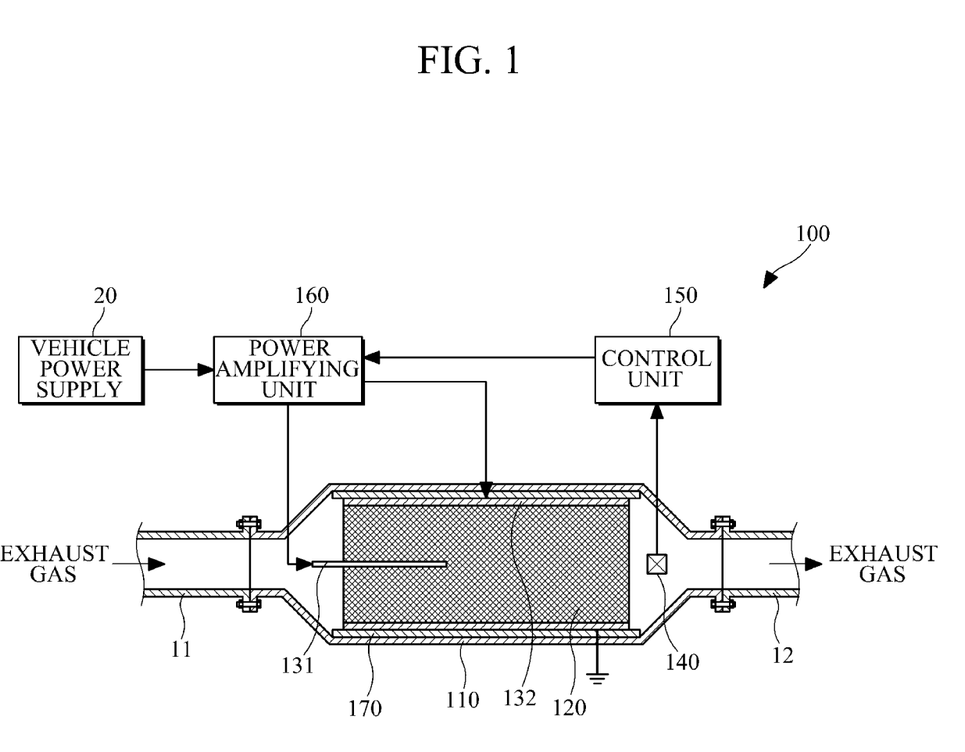
FIG. 1 is a diagram illustrating an example of a particulate matter reduction apparatus for a diesel engine.

FIG. 1 illustrates an example of a particulate matter reduction apparatus for a diesel engine. Referring to FIG. 1, the particulate matter reduction apparatus 100 may include a housing 110, a diesel particulate filter (DPF) 120, a plurality of electrodes 131 and 132, and a control unit 150.

The housing 110 is provided on a flow path along which exhaust gas is discharged from the diesel engine. Accordingly, the exhaust gas discharged from the diesel engine is allowed to flow into the housing 110. The housing 110 may be configured to include outlet pipes 11 and 12 at both ends which are connected by the housing 110. In this example, the outlet pipe 11 acts to guide the exhaust gas discharged from the diesel engine to the housing 110 and the other outlet pipe 12 acts to guide the exhaust gas passing through the housing 110 to be discharged into a muffler or atmosphere.

The filter 120 has a size that can be accommodated within the housing 110. The filter 120 acts to collect particulate matter contained in the exhaust gas that is discharged into the housing 110. The filter 120 may have a variety of structures as long as it can collect particulate matter. For example, the filter 120 may have a porous structure or a honeycomb structure. In addition, the filter 120 may be formed of a material such as silicon carbide which is resistant to high temperatures.

The electrodes 131 and 132 transmit electronic signals to the filter 120. The electrodes 131 and 132 may be supplied with power from an additional power source or from a vehicle power supply to directly heat up the filter 120. To this end, the electrodes 131 and 132 are formed of conductive materials, installed in the filter 120, and electrically connected with the vehicle power supply 20. In response to receiving power from the vehicle power supply 20, the electrodes 131 and 132 enable electric currents to flow to the filter 120. Consequently, the filter 120 can be heated by resistance heat. The power source for the electrodes 131 and 132 is not limited to the vehicle power supply 20, and may be varied. If a vessel or a locomotive is equipped with the particulate matter reduction apparatus 100 for the diesel engine, the electrodes 131 and 132 may be supplied with power from a power supply device of the vessel or the locomotive.

If the filter 120 is heated by the electrodes 131 and 132 as described above, the filter 120 can be heated comparatively uniformly over its entire surface with no overheated portion, and thus the particulate matter collected on the filter 120 is burnt and the filter 120 can be reused. Hence, the reuse efficiency of the filter 120 can be increased.

The vehicle power supply 20 may output 12 V or 24 V depending on a type of a vehicle. One of the electrodes 131 and 132 is electrically connected with a positive electrode of the vehicle and the other is electrically connected with a negative electrode. The vehicle power is supply 20 and the electrodes 131 and 132 may be respectively connected by electric cables such that power can be transmitted to the electrodes 131 and 132 from the vehicle power supply 20.

The control unit 150 controls electronic signals provided to the electrodes 131 and 132.

Operation of the particulate matter reduction apparatus for a diesel engine will now be described below.

While power is being supplied to the whole length of a vehicle from the vehicle power supply 20, for example, while the vehicle's engine is running, a temperature sensor 140 measures a temperature of the filter 120 and outputs the measurement result to the control unit 150. When it is determined that the measured temperature is lower than a previously set temperature, the control unit 150 turns on power to be supplied from the vehicle power supply 20 to the filter so that the electrodes 131 and 132 can be provided with the power.

Thereafter, electric currents flow from the electrodes 131 and 132 to the filter 120, thereby generating resistance heat. If the electric currents continuously flow into the filter 120, the temperature of the filter 120 is increased. Once the temperature of the filter 120 is increased enough to ignite the particulate matter corrected on the filter 120, the combustion of the particulate matter starts.

In the course of burning the particulate matter, when the control unit 150 determines that the temperature of the filter 120 reaches a previously set temperature, the control unit 150 turns off the power supplied to the filter 120 such that the temperature of the filter 120 does not increase any further. Hence, damage to the filter 120 due to exceeding a maximum temperature thereof can be avoided.

If no more power is supplied to the filter 120, the temperature of the filter 120 starts decreasing and falls below a previously set temperature. In response, the control unit 150 turns is on power to be supplied to the filter 120 to heat up the filter 120. When the particulate matter is completely burnt through the above described procedures, the reuse of the filter 120 is realized.

As described above, the method of directly heating the filter 120 removes the particulate matter collected on the filter 120, and thus this method may be more convenient to users, when compared to a method of separating and cleaning the filter according to a prior art. In addition, since the filter 120 is heated by flowing electric currents into the filter 120 by use of the vehicle power supply 20 without an additional power source, the structure may be more simple, compared to a method of heating the filter 120 by use of an electric heater or a diesel burner according to a prior art, and therefore manufacturing cost can be reduced. Moreover, no portion of the filter 120 is overheated, and thus the lifespan of the filter 120 can be maximized.

Furthermore, an additive is not required to be added to a fuel for the particulate matter to ignite at low temperatures, and thus a vehicle does not necessarily use a specific type of fuel.

The filter 120 may have a variety of structures as long as it can collect particulate matter. For example, the filter 120 may have a porous structure or a honeycomb structure. Additionally, the filter 120 may be formed of a material such as silicon carbide which is resistant against high temperatures. In this case, the filter 120 may have a catalyst coated thereon to lower the temperature that is capable of igniting the particulate matter. In the case of a filter having a catalyst coated thereon, although the prior art requires all exhaust gas to be heated, the filter 120 described above can be reused at a lower temperature, since an active site containing the catalyst is directly heated. The filter 120 may be coated with an oxidation catalyst or a NOx storage reduction catalyst. The oxidation catalyst or the NOx storage reduction catalyst enables a temperature of the filter 120 to be maintained at a level suitable for a light-off temperature of the is catalyst in the course of directly heating the filter 120.

The control unit 150 may further include the temperature sensor 140. The temperature sensor 140 acts to measure a temperature of the filter 120. The temperature sensor 140 may be installed not to contact the filter 120 in the housing 110. In this case, the temperature sensor 140 may be located in a portion in which the exhaust gas flows, or a portion from which the exhaust gas is discharged.

The temperature sensor 140 measures a temperature inside the housing 110 to indirectly measure the temperature of the filter 120. For example, a correlation between a temperature inside the housing 110 and a temperature of the filter 120 may be previously defined through an experiment to measure the temperature of the filter 120 accurately. As another example, the temperature sensor 140 may contact the filter 120 to directly measure the temperature of the filter 120. Examples of the temperature sensor 140 may include a thermo couple.

Thereafter, the control unit 150 receives information of the measured temperature from the temperature sensor 140. The control unit 150 controls a flow of electronic signals provided to the filter 120 in such a manner that the temperature of the filter 120 does not exceed the previously set temperature. To this end, the control unit 150 compares the measured temperature with the set temperature. When it is determined that the measured temperature is lower than the set temperature, the control unit 150 turns on the power to be supplied to the filter 120 such that the filter 120 can be heated.

If it is determined that the measured temperature reaches the set temperature, the control unit 150 turns off the power being supplied to the filter 120, thereby stopping heating of the filter 120. By doing this, the filter 120 is prevented from being damaged due to overheating beyond the allowable temperature limit. The control unit 150 may be provided independently from an electronic control device of the vehicle or integrated with the electronic control device. In is addition, the control unit 150 may set a value of electric current flowing through the filter 120 as a control element to control the power. Moreover, the control unit 150 may be implemented to control voltage. The control unit 150 may increase or decrease the voltage applied to the filter 120, thereby controlling the heat generated per unit time.

The particulate matter reduction apparatus 100 may further include a power amplifying unit 160 to amplify the power supplied from the vehicle power supply 20. The power amplifying unit 160 increases the voltage to be provided to the filter 120 from the vehicle power supply 20. That is, if a temperature of the filter 120 does not increase to the previously set temperature because the voltage to be provided to the filter 120 is too low, the power amplifying unit 160 increases the voltage enough to raise the temperature of the filter 120 to the set temperature and provides the increased voltage to the filter 120.

As the temperature of the filter 120 increases due to the power supply, the resistance of the filter 120 decreases, and thus the voltage may be increased as the temperature of the filter 120 decreases, and the voltage may be reduced as the temperature of the filter 120 is increased. Therefore, the amplification factor of the power amplifying unit 160 may be adjustable. In this case, the amplification factor of the power amplifying unit 160 may be adjusted by the control unit 150, and the current flowing time may be adjusted by the frequency modulation.

The particulate matter reduction apparatus 100 may further include a thermal insulation unit 170. The thermal insulation unit 170 is interposed between the housing and the filter 120 to prevent the heat generated from the filter 120 from being transferred to the housing 110. That is, the thermal insulation unit 170 prevents the housing 110 from being damaged due to repeated overheating or deformation by the heat. The thermal insulation unit 170 may be formed of a material having superior thermal resistance, for example, vermiculite containing is mica.

Figure 2:
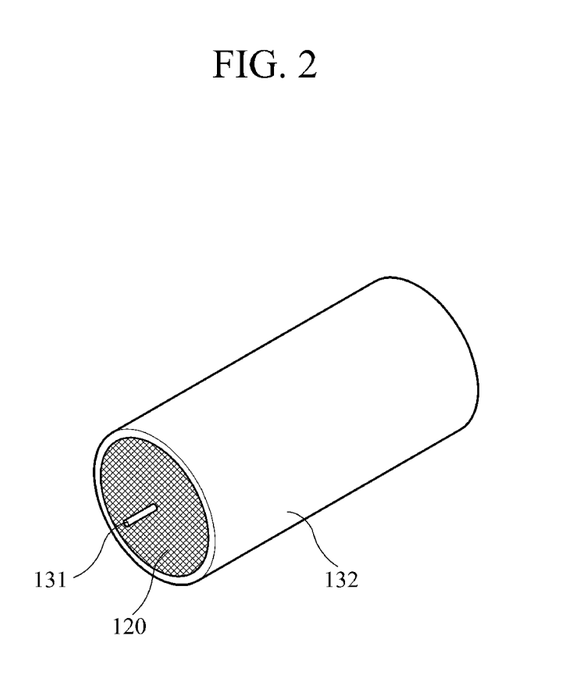
FIG. 2 is a perspective view illustrating an example of electrodes installed on the filter of FIG. 1.

Referring to FIGS. 1 and 2 again, one (e.g. 131) of electrodes 131 and 132 may be formed to be inserted into the center of the filter 120 in a length direction of the filter 120, and the other may be formed to surround the circumference of the filter 120. Here, the electrode 131 that is inserted into the center of the filter 120 may be electrically connected with a positive electrode of the vehicle power supply 20 to function as a power electrode, and the other electrode 132 that surround the circumference of the filter 120 may be electrically connected with a negative electrode of the vehicle power supply 20 to function as a ground electrode.

Figure 3:
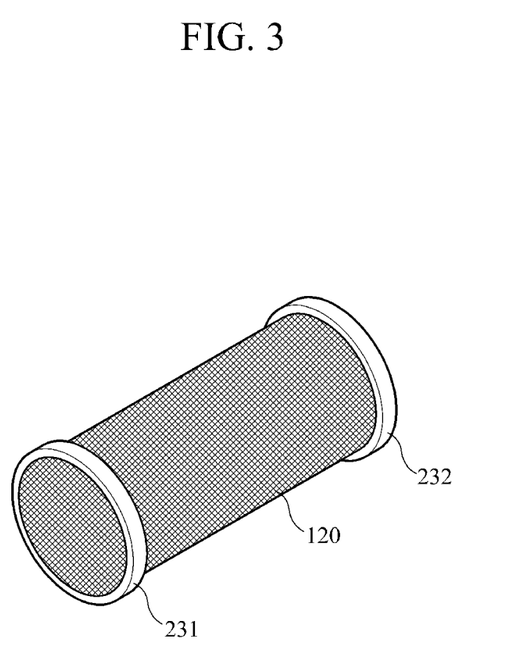
FIG. 3 is a perspective view illustrating another example of electrodes installed on the filter of FIG. 2.

In another example, as shown in FIG. 3, electrodes 231 and 232 in the form of a strip are provided on both ends of the filter 120 while each of the electrodes 231 and 232 surrounds the end of the filter 120. Here, the electrodes 231 and 232 may be formed of a strip-shaped conductive material and adhered to the filter 120. Electric cables connected with the electrodes 231 and 232 may be coated with a covering resistant to high temperatures since the electric cables may be exposed to high temperatures.

Figure 4:
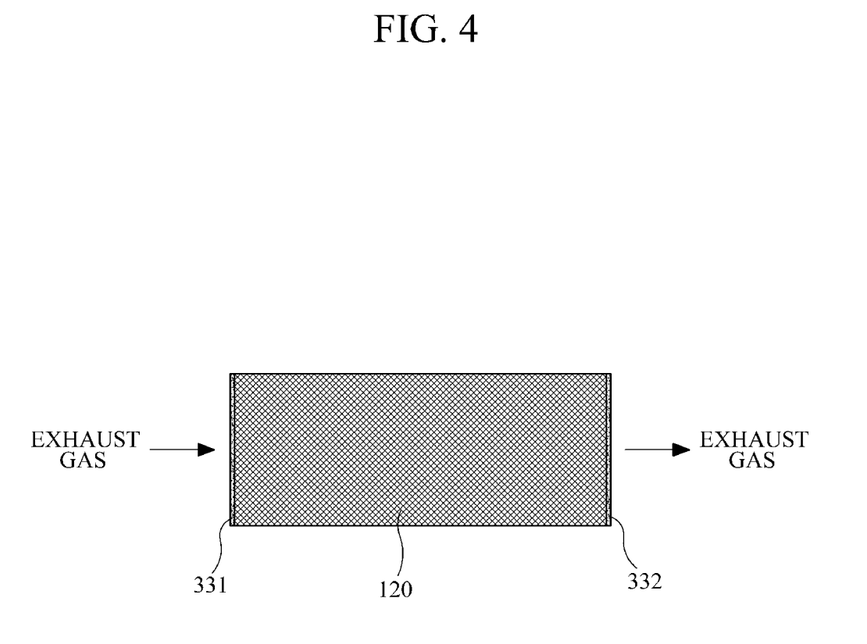
FIG. 4 is a cross-sectional view illustrating another example of electrodes installed on the filter of FIG. 2.

In yet another example, as shown in FIG. 4, electrodes 331 and 332 may be formed on each end of the filter 120. The electrodes 331 and 332 may be formed by applying a conductive coating on each end of the filter 120. The electrode 331 formed on an end of the filter 120 into which the exhaust gas is discharged functions as a ground electrode, and the electrode 332 formed on the other end of the filter 120 from which the exhaust gas is discharged functions as a power electrode. This is because a portion into which the exhaust gas is discharged has a higher contamination level of the particulate matter.

Although the electrodes 331 and 332 may be formed over the entire surface of each end of the filter 120, the electrode 331 that acts as the power electrode may be formed on a part of the end in consideration of the case where the inside of the housing 110 is wet. In addition, is electric cables connected with the electrodes 331 and 332 may be coated with a covering that is resistant to high temperatures since much amount of heat may be transferred thereto.

Figure 5:
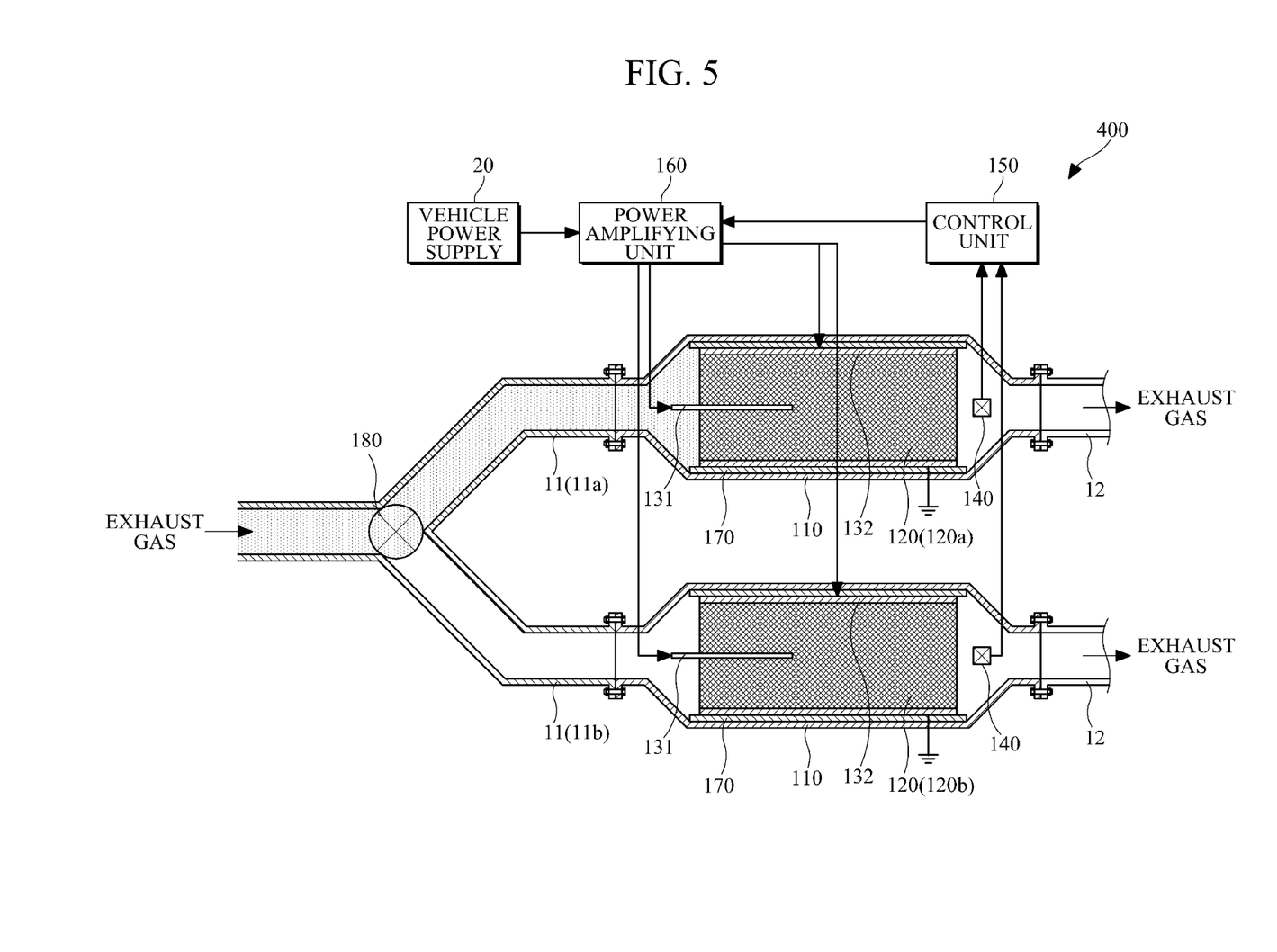
FIG. 5 is a diagram illustrating an example of a particulate matter reduction apparatus for a diesel engine.

FIG. 5 illustrates another example of a particulate matter reduction apparatus for a diesel engine. Referring to FIG. 5, the particulate matter reduction apparatus 400 may include a plurality of branched flow paths 11a and 11b, and housings 110 which are connected with the respective branched flow paths 11a and 11b. A valve 180 may be placed on the flow path.

The valve 180 serves to control the flow of exhaust gas and guide the exhaust gas into one of the branched flow paths 11a and 11b.

The valve 180 may be, for example, a three-way valve. The three-way valve allows the entering exhaust gas to move to one of multiple branched flow paths 11a and 11b. In addition, as another example, each of the flow paths 11a and 11b may have a valve to allow the exhaust gas to be moved toward one of corresponding filters 120a and 120b.

The particulate matter reduction apparatus as described above guides the exhaust gas to the filter 120a that is not in reuse, preventing the exhaust gas from flowing into the filter 120b that is being processed for reuse. Consequently, a significant amount of power is prevented from being consumed because the filter 120b that is heated for reuse is cooled down by the exhaust gas.

Referring to FIG. 2 again, the electrode 131 that is inserted into the center of the filter 120 in the length direction of the filter 120 may be formed to be divided into a plurality of branches to have multiple contact points. The above structure enables the power to be evenly applied over the entire filter 120, preventing the current density from concentrating on a certain part of the filter 120. Hence, the filter 120 can be uniformly heated.

In another example, the filter 120 may be a unit filter which is divided into a plurality of sub-filters.

Figure 6:
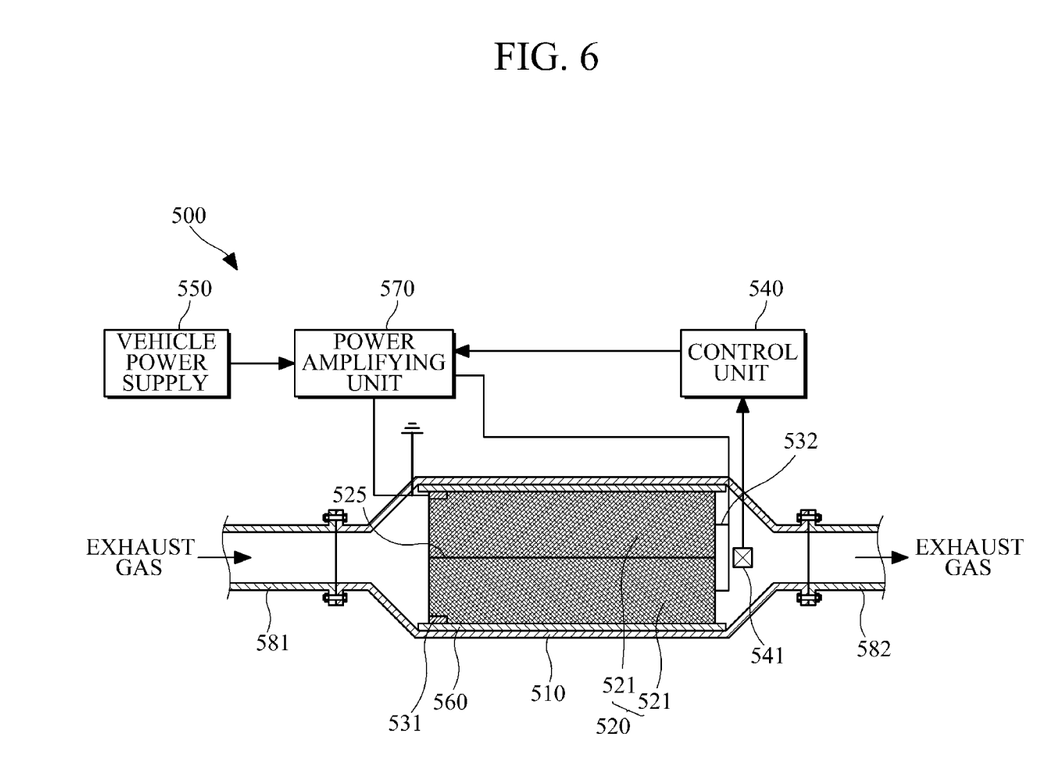
FIG. 6 is a diagram illustrating another example of a particulate matter reduction apparatus for a diesel engine.

FIG. 6 illustrates another example of a particulate matter reduction apparatus for a diesel engine. Referring to FIG. 6, the particulate matter reduction apparatus 500 may include a housing 510, a filter 520, unit electrodes 531 and 532, and a control unit 540.

The housing 510 is installed on a flow path through which exhaust gas is discharged from the diesel engine. The structure of the housing 510 is the same as that of the housing 110 shown in the example of FIG. 1, and thus its description will not be reiterated.

The filter 520 has a size that can be accommodated within the housing 510. The filter 520 acts to collect particulate matter from exhaust gas flowing into the housing 510. The filter 520 may be formed in a length direction of the housing 510, and include unit filter portions 521 which are electrically divided.

For example, the filter 520 may be formed in a cylindrical shape or oval shape, and the unit filter portions 521 may be formed by dividing the filter 520 by a specific angle. If the filter 520 is divided by an angle of 90 degrees, four unit filter portions 521 are generated. If the filter 520 is divided by an angle of 60 degrees, six unit filter portions 521 are generated. Each unit filter portion 521 has a small sectional area and consequently has a small heating volume. If the resistance is significant, a plurality of filter sections may be connected in parallel with one another to form a unit filter portion 521.

The respective unit electrodes 531 and 532 transmit electric signals to the unit filter portions 521. The unit electrodes 531 and 532 are supplied with power from the vehicle power supply 550 to directly heat the filter 520. To this end, the respective unit electrodes 531 and 532 may be formed of a conductive material and disposed on the filter 520. The unit electrodes 531 and 532 may be electrically connected with the vehicle power supply 550.

In response to receiving the power from the vehicle power supply 550, the unit electrodes 531 and 532 allow electric currents to flow into the respective unit filter portions 521. Accordingly, resistance heat is generated on each unit filter portion 521, thereby heating the unit filter portions 521. If the unit filter portions 521 are heated according to the above method, no portions of the unit filter portions 521 are overheated and the entire unit filter portions 521 are relatively uniformly heated, so that the particulate matters collected on the unit filter portions 521 can be ignited, and thus the unit filter portions 521 can be reused. As the result, the reuse efficiency of the filter 520 can be increased.

The control unit 540 controls the electric signals to be provided to the unit electrodes 531 and 532. In addition, the control unit 540 controls the unit filter portions 521 to be heated independently from each other.

Operation of the particulate matter reduction apparatus 500 will be described in detail below.

While power is being supplied to the electric system of a vehicle from the vehicle power supply 550, for example, while the vehicle's engine is running, a temperature sensor 541 measures a temperature of the filter 520 and transmits the measurement result to the control unit 540. When it is determined that the measured temperature is lower than a previously set temperature, the control unit 540 controls the power to be supplied from the vehicle power supply 550 to the respective unit electrodes 531 and 532. Electric currents are allowed to flow from the unit electrodes 531 and 532 into the respective unit filter portions 521, and thus resistance heat is generated on each unit filter portion 521.

When the electric current is continuously flowing into each of the unit filter portions 521, the temperature of the unit filter portion 521 is increased. When the temperatures of the unit filter portions 521 increase to a level that can ignite the particulate matters collected on the unit filter portions 521, the particulate matter starts burning. When the control unit 540 determines is that the temperatures of the unit filter portions 521 reach the set temperature in process of burning the particulate matters, the control unit 540 turns off the power provided to the unit filter portions 521, thus stopping the increase of the temperatures.

Therefore, the damage to the unit filter portions 521 which may be caused by the temperatures of the unit filter portions 521 exceeding the allowable temperature limit can be prevented. Moreover, if no more power is supplied to the unit filter portions 521, the temperatures of the unit filter portions 521 decrease below the set temperature. Then, the control unit 540 turns on the power to be supplied to the unit filter portions 521 so as to heat the unit filter portions 521. Once the particulate matters are completely burnt through the above procedures, the unit filter portions 521 can be reused.

In the example illustrated in FIG. 6, the unit filter portions 521 are separately heated, and thus the power consumption can be reduced in terms of reuse of the filter 520, compared to a filter in an integrated form which has to be heated entirely by the resistance heat.

An insulating adhesive layer 525 may be interposed between the neighboring unit filter portions 521. The insulating adhesive layer 525 may be formed of a material that is capable of adhering particular elements thereto and does not conduct electricity. An example of the insulating adhesive layer 525 may be silicon adhesive.

The particulate matter reduction apparatus 500 may further include a thermal insulation unit 560. Moreover, the particulate matter reduction apparatus 500 may further include a power amplifying unit 570. The structures of the thermal insulation unit 560 and the power amplifying unit 570 are the same as the structures of the thermal insulation unit 170 and the power amplifying unit 160 shown in the example illustrated in FIG. 1, and thus the detailed descriptions will be not reiterated.

Figure 7:
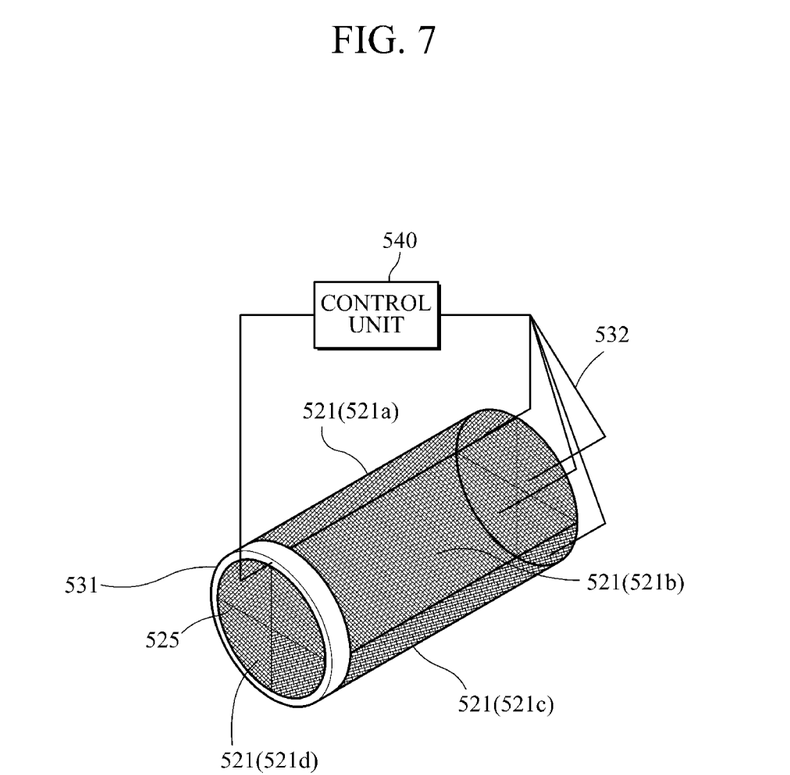
FIG. 7 is a diagram illustrating an example of the unit electrodes formed on each of the unit filter portions shown in FIG. 6.

FIG. 7 illustrates an example of the unit electrodes formed on each of the unit filter portions shown in FIG. 6.

As shown in FIG. 7, the unit electrodes may include first electrodes 531 and second electrodes 532.

The first electrodes 531 may be formed on ends of the unit filter portions 521 to transmit an electric signal commonly to the unit filter portions 521. As shown in FIG. 7, the first electrodes 531 may be formed of a strip-shaped conductive material, and attached to the unit filter portions 521. Alternatively, the first electrodes 531 may be formed in a plane shape and attached to surfaces of the unit filter portions 521. The unit electrodes may be formed on parts of the unit filter portions 521, allowing moisture to diffuse to the outside in the housing 510.

The second electrodes 532 are formed on the other ends of the unit filter portions 521 while being electrically separated according to corresponding unit filter portions 521.

That is, if the first electrodes 531 are formed on front ends of the unit filter portions 521 into which the exhaust gas flows, the second electrodes 532 are formed on rear ends of the unit filter portions 521 through which the exhaust gas is discharged.

Figure 8:
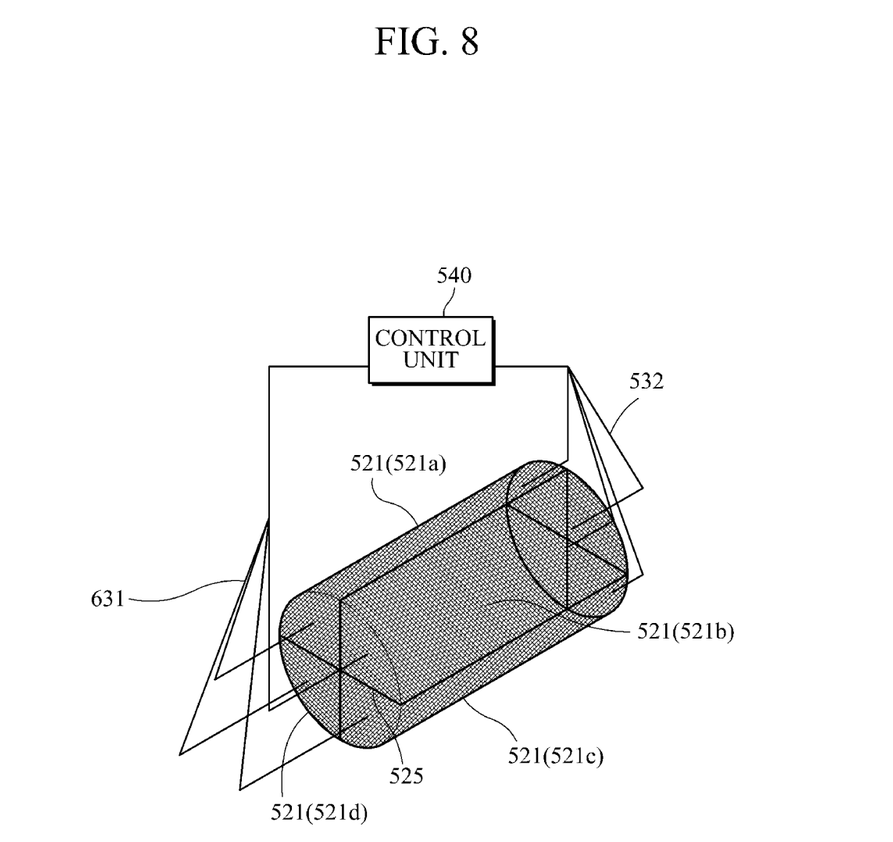
FIG. 8 is a diagram illustrating an example of modification of the unit electrodes formed on each of the unit filter portions shown in the example illustrated in FIG. 6.

FIG. 8 illustrates an example of modification of the unit electrodes formed on each of the unit filter portions shown in the example illustrated in FIG. 6.

As the modification of the unit electrodes, as shown in FIG. 8, first electrodes 631 are formed on one ends of the unit filter portions 521 and portions of the first electrodes 631 are electrically separated according to corresponding unit filter portions 521. The first electrodes 631 allow the unit filter portions 521 to be heated independently from one another.

The first electrodes 631 may be electrically connected with a negative electrode of the vehicle power supply 550 to function as a ground electrode, and the second electrodes 532 may be electrically connected with a positive electrode of the vehicle power supply 550 to function as is a power electrode. This is because generally a portion into which exhaust gas flows has a high contamination level of particulate matter and the accumulated particulate matters can cause the electric current to be applied to the first electrode 631 which is formed on the portion into which the exhaust gas flows. Accordingly, if the first electrode 631 is a ground electrode, the damage to the first electrode 631 due to the electric current to be applied to the first electrode 631 can be prevented.

Referring to FIGS. 7 and 8 again, the unit electrodes 531, 631, and 532 may be formed by a plurality of wires in a net form, and embedded into or attached to the unit filter portions 521. The above structure enables the power to be evenly applied to the entire unit filter portions 521, thereby heating the entire unit filter portions 521 uniformly without the occurrence of an overheated portion on the unit filter portions 521. Here, the thickness of the wires may range from 0.1 mm to 0.5 mm. If the thickness of the wires is equal to or thinner than 0.1 mm, the wire may be damaged by oxidation, and if the thickness is equal to or thicker than 0.5 mm, it can be difficult to discharge the exhaust gas through the unit filter portions 521.

The control unit 540 may apply electric signals to the respective unit filter portions 521 sequentially.

Figure 9:
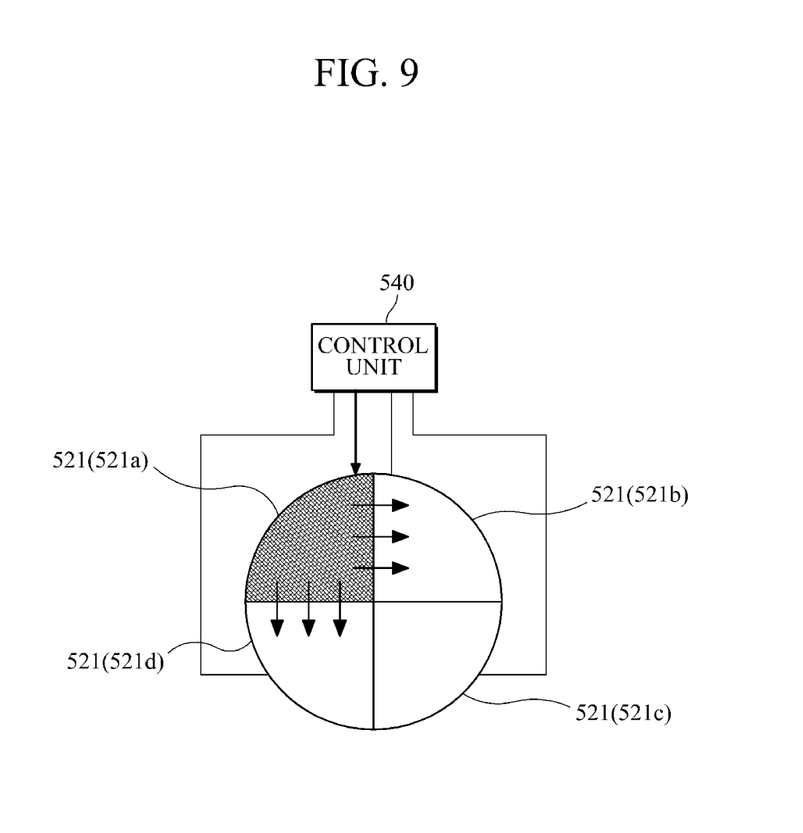
FIGS. 9 and 10 are diagrams illustrating examples of how the power is applied sequentially to the unit filter portions shown in FIG. 8.
Figure 10:
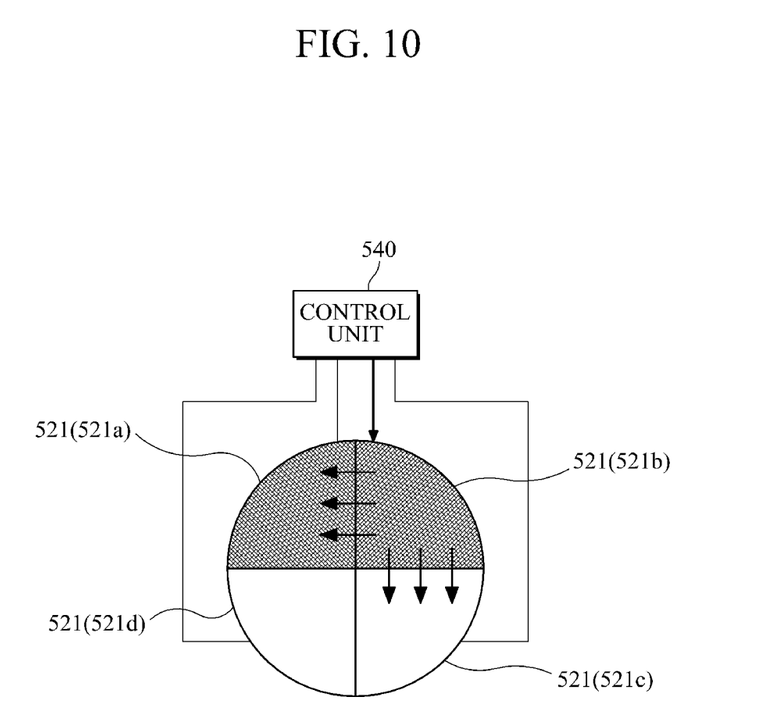

FIGS. 9 and 10 illustrate examples of how the power is applied sequentially to the unit filter portions shown in FIG. 8. The unit filter portions include a first unit filter portion 521a, a second filter portion 521b, a third filter portion 521c, and a fourth filter portion 521d in a counterclockwise direction.

Referring to FIG. 9, the control unit 540 applies power to the first unit filter portion 521a to heat the first unit filter portion 521a. Some heat generated on the first unit filter portion 521a is transferred to the second and fourth unit filter portions 521b and 521d so that the second and fourth unit filter portions 521b and 521d are heated.

Thereafter, as shown in FIG. 10, the control unit 540 applies power to the second unit filter portion 521b to heat the second unit filter portion 521b. Here, the second unit filter portion 521b has been preheated by the heat from the first unit filter portion 521a, thus consuming less power than the first unit filter portion 521a. Although not illustrated, the control unit 540 applies power to the third unit filter portion 521c and the fourth unit filter portion 521d to heat the entire filter.

Figure 11:
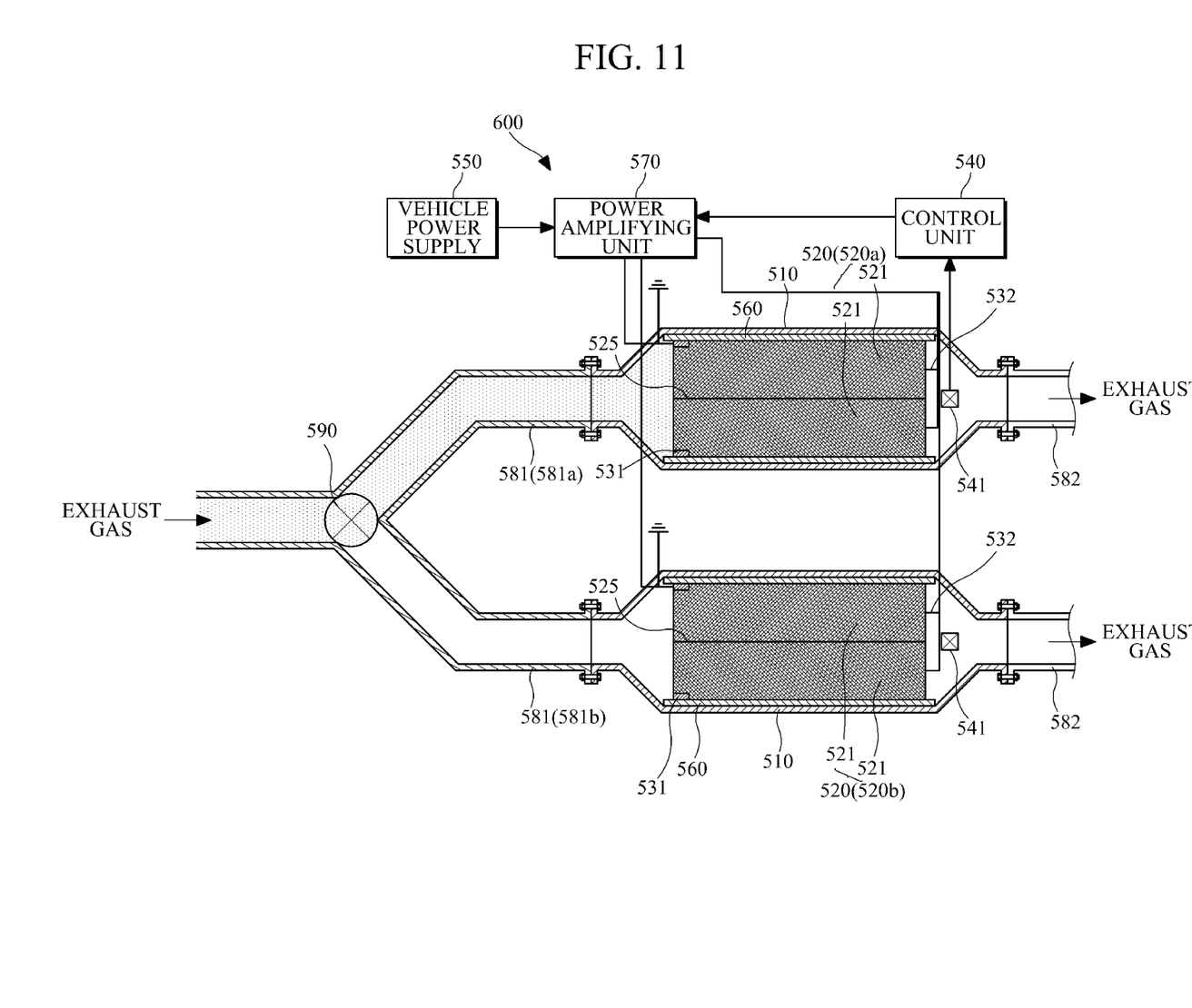
FIG. 11 is a diagram illustrating an example of modification of the particulate matter reduction apparatus shown in the example illustrated in FIG. 6.

FIG. 11 illustrates an example of modification of the particulate matter reduction apparatus shown in the example illustrated in FIG. 6.

As shown in FIG. 11, the particulate matter reduction apparatus 600 may include a plurality of branched flow paths 581a and 581b, and housings 510 connected with the respective branched flow paths 581a and 581b. In this case, the valve 590 may be provided on a main flow path. The valve 590 may control the flow of exhaust gas, and guide the exhaust gas into one of the branched flow paths 581a and 581b.

The valve 590 may be, for example, a three-way valve. The three-way valve allows the entering exhaust gas to selectively flow into one of the branched flow paths 581a and 581b. For another example, valves may be provided on the respective branched flow paths 581a and 581b to guide the exhaust gas to a corresponding flow path.

The particulate matter reduction apparatus 600 with the above described structure guides the exhaust gas into the filter 520a which is not in reuse while preventing the exhaust gas from flowing into the other filter 520b that is being processed for reuse. Consequently, since the exhaust gas that can cool down the filter 520b which is to be heated for reuse, the additional power consumption for heating the filter 520b is prevented.

The particulate matter reduction apparatus described above is applicable to industrial fields that require reducing particulate matter discharged from a diesel engine.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A particulate matter reduction apparatus for a diesel engine, the articulate is matter reduction apparatus comprising:
    a housing configured to be placed on a flow path through which exhaust gas from the diesel engine is discharged;
    a filter configured to comprise a plurality of unit filter portions, each extending in a length direction of the housing and being accommodated in the housing;
    a plurality of unit electrodes configured to transmit electronic signals individually to the respective unit filter portions; and
    a control unit configured to control electronic signals provided to the unit electrodes and allow the unit filter portions to be heated independently, wherein:
    the control unit is further configured to assign the electronic signals sequentially to the respective unit filter portions,
    the unit filter portions which are adjacent to each other have a non-conductive adhesive layer interposed therebetween,
    the unit electrodes comprise first electrodes configured to be formed on an exhaust-gas inflow end of the unit filter portions and transmit an electronic signal in common to the unit filter portions, and second electrodes configured to be formed on an exhaust-gas outflow end of the unit filter portions and comprise portions electrically separated from one another according to corresponding unit filter portions, and
    the first and second electrodes induce current flow between the exhaust-gas inflow end and the exhaust-gas outflow end when a voltage exists between the first electrodes and the second electrodes.

2. A particulate matter reduction apparatus for a diesel engine, the particulate is matter reduction apparatus comprising:
    a housing configured to be placed on a flow path through which exhaust gas from the diesel engine is discharged;
    a filter configured to comprise a plurality of unit filter portions, each extending in a length direction of the housing and being accommodated in the housing;
    a plurality of unit electrodes configured to transmit electronic signals individually to the respective unit filter portions; and a control unit configured to control electronic signals provided to the unit electrodes and allow the unit filter portions to be heated independently, wherein:

the control unit is further configured to assign the electronic signals sequentially to the respective unit filter portions, the unit filter portions which are adjacent to each other have a non-conductive adhesive layer interposed therebetween, the unit electrodes comprises first electrodes configured to be formed on an exhaust-gas inflow end of the unit filter portions while being electrically separated according to corresponding unit filter portions and second electrodes configured to be formed on an exhaust-gas outflow end of the unit filter portions while being is electrically separated according to corresponding unit filter portions, and the first and second electrodes induce current flow between the exhaust-gas inflow end and the exhaust-gas outflow end when a voltage exists between the first electrodes and the second electrodes.

3. The particulate matter reduction apparatus of claim 1, wherein the unit electrodes are formed by a plurality of wires in a net form, and embedded into or attached to the unit filter portions.

4. The particulate matter reduction apparatus of claim 2, wherein the unit electrodes are formed by a plurality of wires in a net form, and embedded into or attached to the unit filter portions.

* * * * *